(12) United States Patent  (10) Patent No.: US 8,135,813 B2
Gonzalez et al.  (45) Date of Patent: Mar. 13, 2012

(54) METHOD, SYSTEM AND PROGRAM PRODUCT FOR REMOTELY DEPLOYING AND AUTOMATICALLY CUSTOMIZING WORKSTATION IMAGES

(75) Inventors: Izzac Gonzalez, Poughkeepsie, NY (US); Carl D. Jacobs, Poughquag, NY (US); Brandon T. DeCoster, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 11/741,035

(22) Filed: Apr. 27, 2007

(65) Prior Publication Data
US 2008/0270583 A1 Oct. 30, 2008

(51) Int. Cl.
*G06F 15/177* (2006.01)
*G06F 9/00* (2006.01)
*G06F 17/00* (2006.01)
*G06F 3/00* (2006.01)

(52) U.S. Cl. ............. 709/222; 713/1; 715/205; 715/760

(58) Field of Classification Search .......... 709/217–229; 707/202; 713/1; 715/513, 760
See application file for complete search history.

(56) References Cited

U.S. PATENT DOCUMENTS

| | | | |
|---|---|---|---|
| 5,555,416 A | 9/1996 | Owens et al. | |
| 5,680,547 A | 10/1997 | Chang | |
| 5,764,593 A | 6/1998 | Turpin et al. | |
| 5,978,911 A | 11/1999 | Knox et al. | |
| 6,466,972 B1 | 10/2002 | Paul et al. | |
| 6,535,976 B1 | 3/2003 | Hoggarth et al. | |
| 6,684,327 B1 | 1/2004 | Anand et al. | |
| 6,748,525 B1 | 6/2004 | Hubacher et al. | |
| 6,966,060 B1 | 11/2005 | Young et al. | |
| 7,055,148 B2 | 5/2006 | Marsh et al. | |
| 7,100,159 B2 | 8/2006 | Clairborne | |
| 7,111,055 B2 | 9/2006 | Falkner | |
| 7,356,679 B1 * | 4/2008 | Le et al. ........................... 713/1 |
| 2003/0009754 A1 | 1/2003 | Rowley et al. | |
| 2003/0018759 A1 | 1/2003 | Baumann | |
| 2004/0040023 A1 | 2/2004 | Ellis et al. | |
| 2004/0205554 A1 * | 10/2004 | Goswami et al. ............. 715/513 |
| 2004/0267716 A1 | 12/2004 | Prabu et al. | |
| 2005/0144617 A1 | 6/2005 | Chefalas et al. | |
| 2005/0160420 A1 | 7/2005 | Kruta et al. | |
| 2005/0268243 A1 * | 12/2005 | Moser ........................... 715/760 |
| 2005/0283779 A1 | 12/2005 | Pronk van Hoogeveen et al. | |
| 2008/0120350 A1 * | 5/2008 | Grabowski et al. ........... 707/202 |

OTHER PUBLICATIONS

PCT/EP2008/054341—Filed Apr. 2008—PCT ISR/WO.

* cited by examiner

*Primary Examiner* — Ian N Moore
*Assistant Examiner* — Kiet Tang
(74) *Attorney, Agent, or Firm* — Schmeiser, Olsen & Watts; Wenjie Li

(57) ABSTRACT

A method, system and program product for remotely deploying and automatically customizing workstation images. A client's first partition receives a workstation image deployed from a server in communication with the client via a network. The image includes a customization script. The server remotely boots the client, which is pre-configured to be booted by the server via the network. The server writes a customization parameter to the client's shared partition. The shared partition has a file system type that is accessible by the server via the remote boot and by the deployed image. One or more subsequent reboots of the client include the deployed image obtaining the customization parameter from the shared partition, identifying the customization script by using the customization parameter, and executing the customization script to automatically customize the client.

20 Claims, 9 Drawing Sheets

550

```
[root@23WFY24 /]# ls /mnt/rdm
config.var  linuxcfg.bat
[root@23WFY24 /]# cat /mnt/rdm/linuxcfg.bat
@echo off
lccustom c:\config.var
```

```
[root@23WFY24 /]# ls /mnt/rdm
config.var  linuxcfg.bat
[root@23WFY24 /]# cat /mnt/rdm/config.var
%CONFIG%
```

```
mount -t msdos /dev/hda3 /mnt/rdm
if [ -f /mnt/rdm/custom ]
        then
                cat /mnt/rdm/custom > /home/mfguser2/custom
                rm -f /mnt/rdm/custom
                umount /dev/hda3
fi
```

FIG. 6

```
700 ─▶
if [ -f /home/mfguser2/custom ] ;
    then
        dos2unix /home/mfguser2/custom
        /home/mfguser2/customization/`cat /home/mfguser2/custom`/`cat /home/mfguser2/custom`/`cat /home/mfgu
ser2/custom`
        rm /home/mfguser2/custom
        reboot
fi
```

*FIG. 7A*

```
750 ─▶
[root@23WFY24 /]# ls/home/mfguser2/customization/
barcode c4 current default pokmmh tabware51 windsor
[root@23WFY24 /]# ls/home/mfguser2/customization/c4/
bookmarks.html c4
[root@23WFY24 /]# cat /home/mfguser2/customization/c4/c4
!/bin/bash cd /home/mfguser2/customization/c4
cp -f * ../current/
echo "C4" >> ../../version
ln -f /home/mfguser2/customization/current/bookmarks.html /home/mfguser2/.mozill
a/firefox/profile.default/bookmarks.html°
```

*FIG. 7B*

METHOD, SYSTEM AND PROGRAM PRODUCT FOR REMOTELY DEPLOYING AND AUTOMATICALLY CUSTOMIZING WORKSTATION IMAGES

FIELD OF THE INVENTION

The present invention relates to a method and system for remotely deploying and automatically customizing workstation images, and more particularly to a technique for automatically customizing remotely deployed operating system images.

BACKGROUND

Conventional deployment management software is used to remotely deploy various types of workstation images (e.g., operating system images), as well as application packages. Such deployment software cannot, however, be used to customize a workstation image that has been remotely deployed. Image customization includes, for example, designating a unique workstation name, assigned printers, web browser bookmarks, and specific hosts to access for data. When a workstation image is remotely deployed using conventional software, the image is an exact copy of the donor machine from which it was created. Manual effort is required to customize the deployed image so that it is usable for a specific area to which the image was deployed. The manual configuration also requires that the person performing the customization has the proper knowledge and can follow the customization procedure exactly to ensure the system works as required. Such manual intervention is at risk for human error, which can make the resulting system inoperable. In some cases using known deployment techniques, this manual effort involves direct access to the system being customized, thereby requiring a field trip to a remote location, which defeats the purpose of remotely deploying the image. Other known cases require an excessive amount of storage space and development and maintenance effort because separate images are supported for each site. Thus, there exists a need to overcome at least one of the preceding deficiencies and limitations of the related art.

SUMMARY OF THE INVENTION

In first embodiments, the present invention provides a computer-implemented method of automatically customizing remotely deployed workstation images, the method comprising:

receiving, at a first partition coupled to a client workstation, a workstation image deployed from a server computing system, the workstation image originally cloned from a donor workstation and including a pre-defined customization script, the server computing system and the client workstation in communication via a network;

booting the client workstation via a remote boot by the server computing system on the network, wherein the client workstation is pre-configured to be booted by the server computing system via the network, the booting the client workstation via the remote boot including receiving a customization parameter by a shared partition coupled to the client workstation, the shared partition having a file system type that is accessible by the server computing system via the remote boot and by the workstation image deployed from the server computing system; and rebooting the client workstation subsequent to the booting the client workstation via the remote boot, wherein the rebooting includes:

obtaining the customization parameter from the shared partition by the workstation image, identifying, subsequent to the obtaining, the pre-defined customization script, the identifying including utilizing the customization parameter as an identifier of the pre-defined customization script, and executing the pre-defined customization script, the executing resulting in an automatic and remote customization of the client workstation.

In second embodiments, the present invention provides a computer-implemented method of remotely deploying and automatically customizing client workstation images, the method comprising:

deploying, by a server computing system, a workstation image to a first partition of a client workstation, the workstation image originally cloned from a donor workstation and including a pre-defined customization script, the server computing system and the client workstation in communication via a network; and remotely booting the client workstation by the server computing system on the network, wherein the client workstation is pre-configured to be booted by the server computing system via the network, the remotely booting including writing a customization parameter to a shared partition coupled to the client workstation, the shared partition having a file system type that is accessible by the server computing system via the remotely booting and by the deployed workstation image, wherein the remotely booting initiates an automatic customization of the client workstation, the customization including one or more subsequent boots of the client workstation, an automatic obtaining of the customization parameter from the shared partition by the deployed workstation image, an automatic identification of the pre-defined customization script provided by the customization parameter, and an automatic execution of the pre-defined customization script.

Systems and computer program products corresponding to the above-summarized methods are also described herein.

Advantageously, the present invention provides remote deployment and automatic customization of client workstation images that allows a common workstation image to be configured to be used in a number of different environments, thereby saving time and effort during the deployment to all of the different environments. The technique disclosed herein provides for fewer images to support, store and maintain, thus lowering the overall cost of maintenance. Since the deployment and customization process of the present invention is automated, the likelihood for error is reduced. Furthermore, the present invention's utilization of a shared partition eliminates a need for any communication software to be run on the client workstation being customized, and therefore the present invention avoids compatibility and network communication problems associated with running communication software.

BRIEF DESCRIPTION OF THE DRAWINGS

FIG. 5B is an example of a batch file called by the script of FIG. 5A, in accordance with embodiments of the present invention.

FIG. 5C is an example of contents of the shared partition that is written to by the script of FIG. 5A, in accordance with embodiments of the present invention.

FIG. 6 is an example of a script that accesses a customization parameter in a shared partition and copies the customization parameter to a file in an operating system partition in the process of FIG. 3, in accordance with embodiments of the present invention.

FIG. 7A is an example of a script that reads a customization parameter file in an operating system partition and initiates an embedded customization script in the process of FIG. 3, in accordance with embodiments of the present invention.

FIG. 7B is an example of an embedded customization script initiated by the script of FIG. 7A, in accordance with embodiments of the present invention.

DETAILED DESCRIPTION OF THE INVENTION

The present invention provides remote deployment and remote and automatic customization of cloned workstation images. The technique disclosed herein allows for configuring a common workstation image to be used in a number of heterogeneous environments. In one embodiment, the present invention provides remote deployment and remote and automatic customization of operating system images. As used herein, a workstation is defined to be an end user's computing unit in a network. A workstation may be, for example, a terminal or a desktop computer.

Deployment and Customization System

Figure 1:
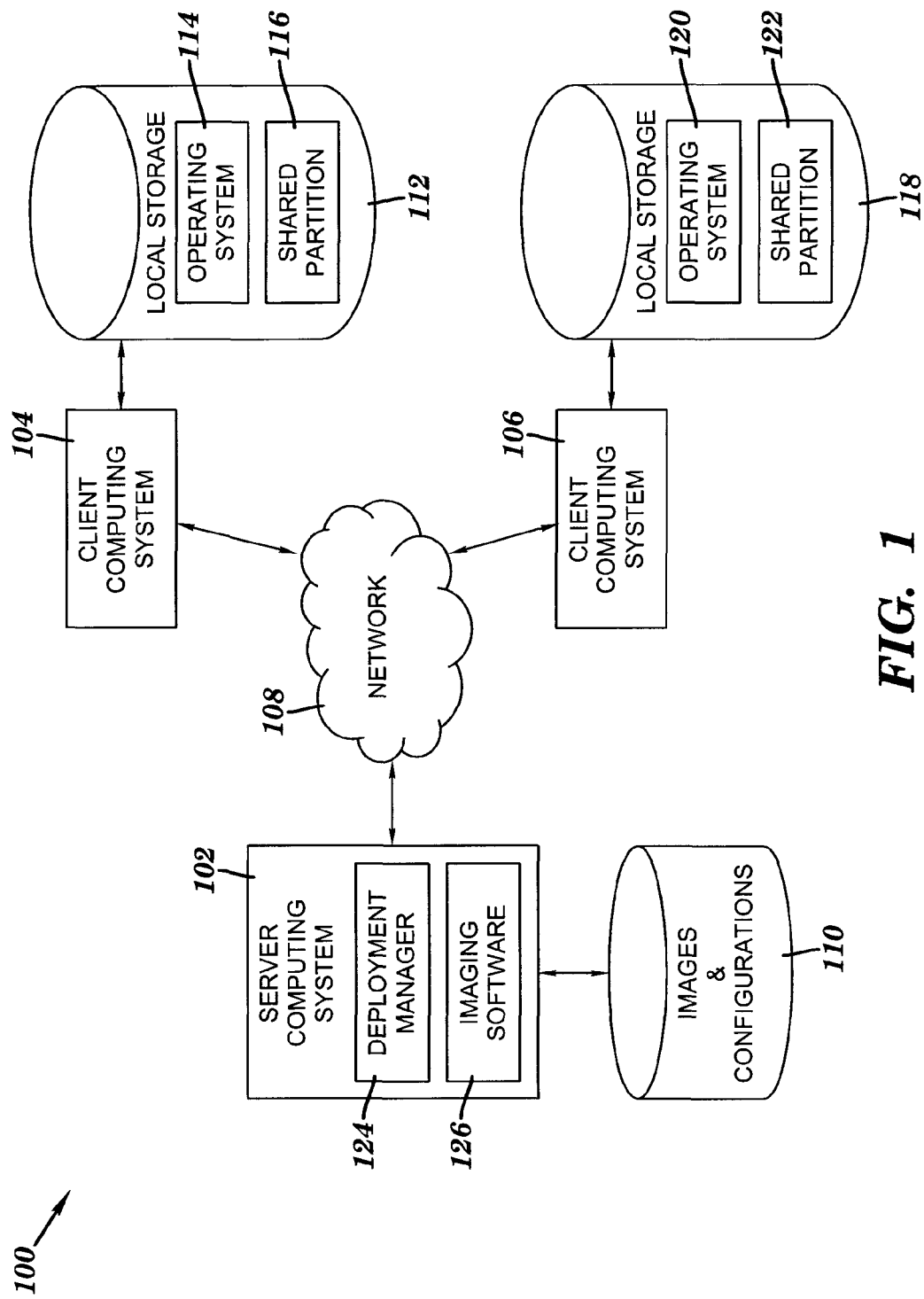
FIG. 1 is a block diagram of a system for remotely deploying and automatically customizing workstation images, in accordance with embodiments of the present invention.

FIG. 1 is a block diagram of a system for remotely deploying and automatically customizing workstation images, in accordance with embodiments of the present invention. System 100 includes a server computing system 102 (a.k.a. server) and multiple client computing systems 104, 106 (a.k.a. client workstations or clients) in communication via a network 108. Server 102 is coupled to one or more data repositories (e.g., one or more databases or one or more data storage units) 110 that include one or more workstation images (e.g., operating system images) and one or more sets of configuration data for customizing client workstations. In one embodiment, the configuration data includes customization information for one or more operating system images.

Client computing system 104 is coupled to a local data storage unit 112 (e.g., local hard disk) that includes an operating system 114 in a partition of local storage 112 and a shared partition 116. Similarly, client computing system 106 is coupled to local data storage unit 118 (e.g., local hard disk) that includes an operating system 120 in a partition of local storage 118 and a shared partition 122. Operating systems 114 and 120 may be the same or different operating systems.

Server computing system 102 executes deployment manager software 124 and imaging software 126. Imaging software 126 gathers information from a donor workstation (not shown) to determine the structure of an image (e.g., operating system image) to be deployed to a client computing system, along with how to take the image and how to store the image. Imaging software 126 also deploys the image (i.e., writes out the image) to a client computing system.

Deployment manager software 124 includes scripts that use the Pre-boot Execution Environment (PXE) to set up customization files on client computing systems 104 and 106. Deployment manager software 124 is, for example, Remote Deployment Manager (RDM) software working in conjunction with IBM Director. IBM Director is a suite of software tools that provide tracking of hardware configurations of remote systems and monitor the usage and performance of critical components in the remote systems. RDM facilitates deployment tasks such as initial operating system installation, Basic Input/Output System (BIOS) updates, and disposal of retired systems. IBM Director and RDM operate in a client-server environment and are offered by International Business Machines Corporation of Armonk, N.Y.

Shared partition 116 is a file system space of local storage 112 that is accessed (i.e., read from and written to) by both operating system 114 and deployment manager software 124. Similarly, shared partition 122 is a file system space of local storage 118 that is accessed by both operating system 120 and deployment manager 124. In one embodiment, shared partitions 116 and 122 are File Allocation Table (FAT) partitions. To provide the aforementioned common access to the shared partitions, deployment manager 124 and operating systems 114 and 120 are required to support the same file system type. In one embodiment, deployment manager 124 and operating systems 114 and 120 support the FAT file system type.

In one embodiment, each client computing system of system 100 is identified by a unique serial number. For example, IBM Director identifies each client computing system by the client's unique serial number. In order to perform the automated customization disclosed herein, each of the multiple client computing systems 104, 106 are configured to boot from the network (i.e., configured to be booted by server 102 via network 108). In one embodiment, configuring a client computing system to boot from the network is performed by setting "Network" as the first boot device in the client's BIOS. When a client boots from the network, deployment manager 124 responds by using the Pre-boot Execution Environment (PXE) to boot the client to a Disk Operating System (DOS) operating system environment. It is in this DOS environment in which DOS software tools are available to perform specific functions. One of these DOS software tools is the LCCUSTOM application, which replaces DOS environment variables within a file with values specified in deployment manager 124 by the person administering the deployment of the donor image. The function of LCCUSTOM in the deployment and customization process is described in more detail below.

Deployment and Customization Process

Figure 2:
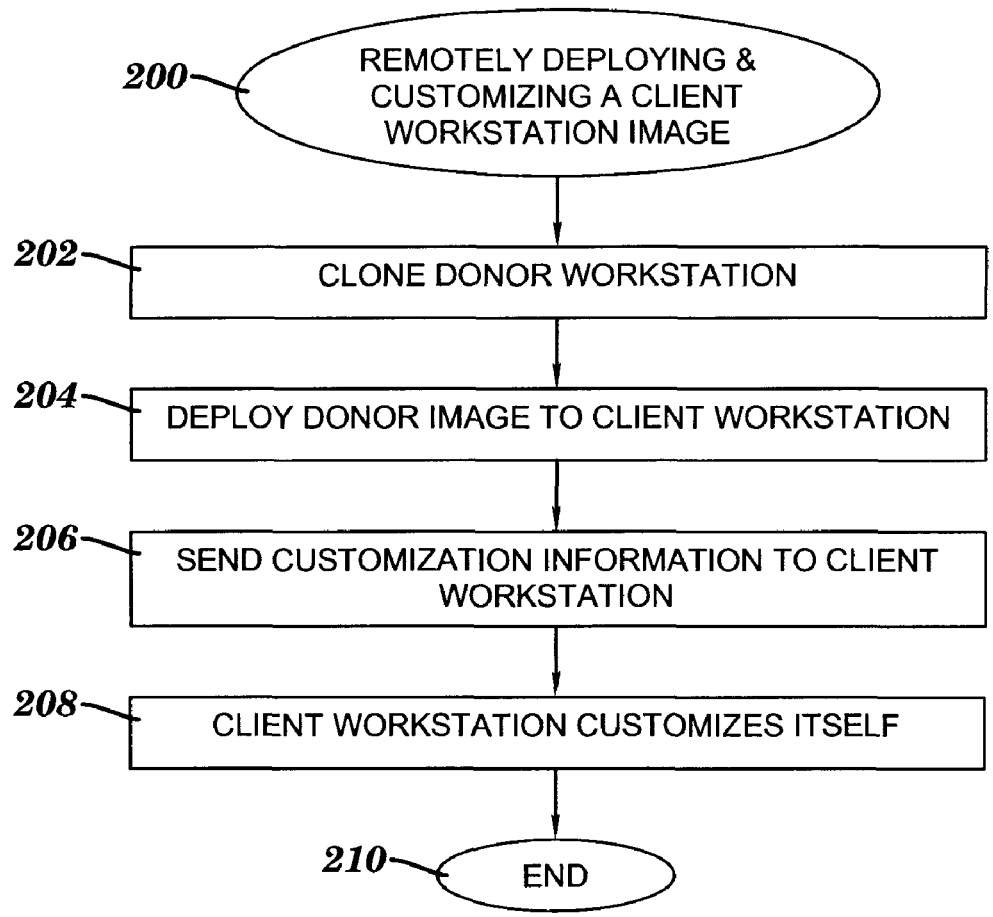
FIG. 2 is a flow chart of a process of remotely deploying and automatically customizing workstation images using the system of FIG. 1, in accordance with embodiments of the present invention.

FIG. 2 is a flow chart of a process of remotely deploying and automatically customizing workstation images using the system of FIG. 1, in accordance with embodiments of the present invention. The process of remotely deploying and automatically customizing a workstation image starts at step 200. In step 202, imaging software 126 (see FIG. 1) clones a donor workstation to obtain (i.e., capture) a workstation image (i.e., a donor image) which is stored in the images repository 110 (see FIG. 1).

In one embodiment, the workstation image obtained in step 202 is an operating system image where the operating system supports the FAT file system type. Therefore, prior to step 202, a formatted FAT partition (a.k.a. DOS partition) is configured in the original donor workstation image. A text file and a batch file are included within this DOS partition. Furthermore, customization scripts are pre-defined and embedded in the donor workstation image prior to step 202.

For example, in step 202, imaging software 126 (see FIG. 1) determines the structure of an operating system image residing on a donor workstation and obtains the operating system image. In step 204, imaging software 126 (see FIG. 1) retrieves the donor image stored in images repository 110 (see FIG. 1) in step 202 and deploys the donor image to one or more client workstations 104, 106 (see FIG. 1).

As one example, Powerquest DeployCenter® is used to capture and deploy a donor workstation image in steps 202 and 204. Powerquest DeployCenter® is offered by Symantec Corporation of Cupertino, Calif. In this example, the RDM software utilizes a Deploy Task that is created and configured so that Powerquest DeployCenter® knows which image to deploy to the client workstation.

In step 206, deployment manager 124 (see FIG. 1) retrieves customization information (a.k.a. configuration data) from configurations 110 (see FIG. 1) and sends the customization information to one or more client workstations 104, 106 (see FIG. 1). Although not shown in FIG. 2, the one or more client workstations 104, 106 (see FIG. 1) receive the customization information subsequent to step 206.

In step 208, a client workstation 104 or 106 (see FIG. 1) boots up, utilizes the customization information received subsequent to step 206, and customizes itself based on the received customization information. In one embodiment, during the customization process of step 208, the batch file included in the aforementioned DOS partition configured prior to step 202 is executed, which then triggers execution of the LCCUSTOM application. The execution of the LCCUSTOM application modifies the aforementioned text file with the value specified in the customization task parameters, as described below. The text file is copied and renamed (e.g. renamed as CUSTOM), as described below relative to FIG. 3. The process of remotely deploying and automatically customizing client workstation images ends at step 210.

Figure 3:
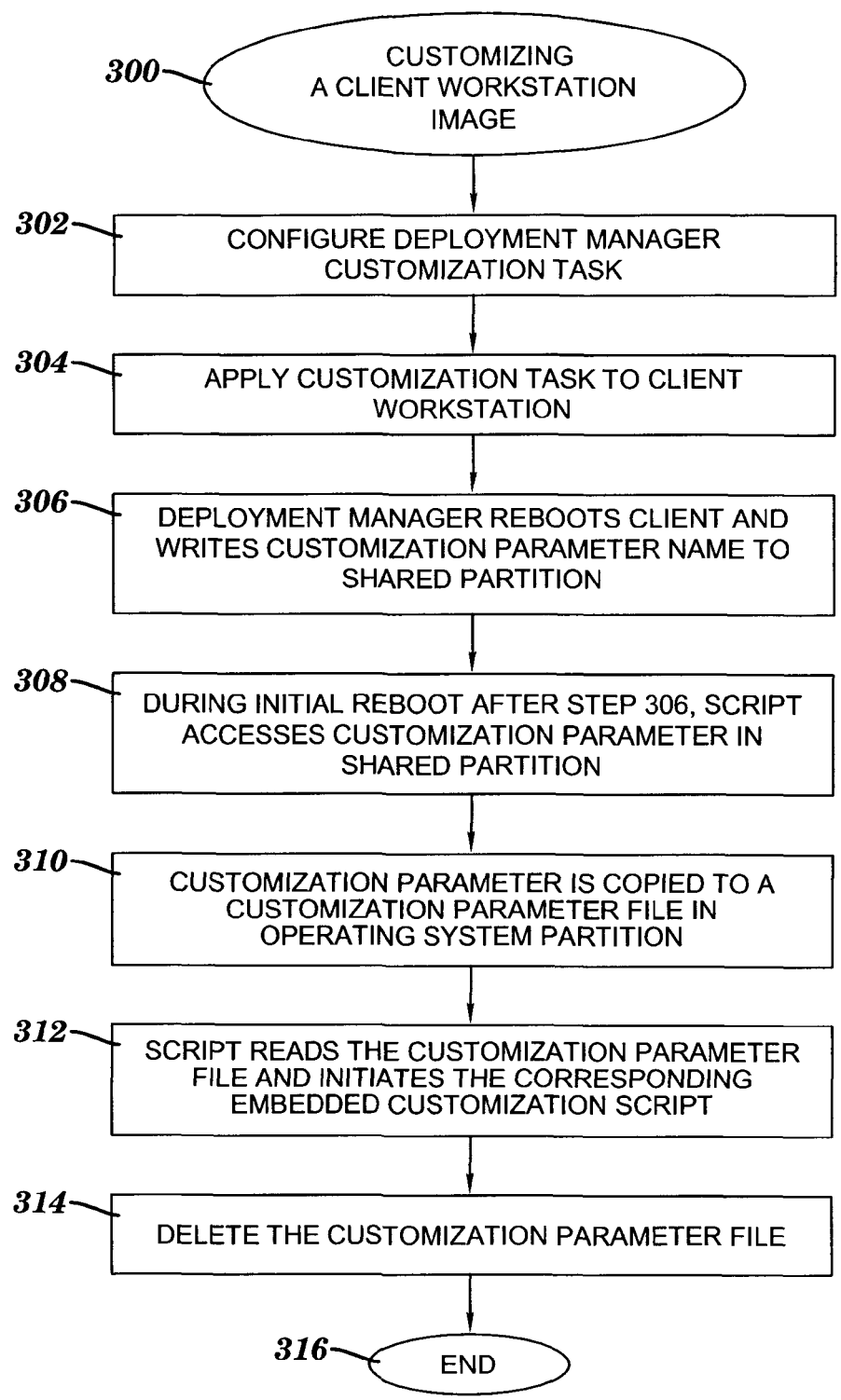
FIG. 3 is a flow chart of a process of customizing a workstation image within the process of FIG. 2, in accordance with embodiments of the present invention.

FIG. 3 is a flow chart of a process of customizing a workstation image within the process of FIG. 2, in accordance with embodiments of the present invention. It should be noted that in the description of FIG. 3 and the descriptions of the figures that follow, references to client workstation 104 (see FIG. 1) can be replaced with references to client workstation 106 (see FIG. 1). Similarly, any references to operating system partition 114 and shared partition 116 of FIG. 1 can be replaced with, respectively, operating system partition 120 and shared partition 122 of FIG. 1.

The workstation image customization process begins at step 300. In step 302, customization information is entered into the configurations repository 110 (see FIG. 1) by, for example, an administrator. The customization information includes the deployment manager customization task (also referred to herein simply as "customization task"). Entering the customization information is also referred to herein as configuring the deployment manager customization task. The customization information entered in step 302 is to be transferred to shared partition 116 (see FIG. 1) and is to be read by operating system partition 114 (see FIG. 1) of client workstation 104 (see FIG. 1). In one embodiment, the customization task is generated as a batch file. As one example, the batch file is a Customize Task created by the RDM software. The Customize Task is executed on a client only after an image has been deployed using the Deploy Task. Customize Task includes User Parameters that allow the user to define the type of customization to be performed on the client.

Step 208 of FIG. 2 utilizes the customization information entered in step 302 to customize a client workstation. In one embodiment, step 302 is completed prior to deployment steps 202 and 204 of the process of FIG. 2.

In step 304, deployment manager 124 applies the customization task entered in step 302 to client workstation 104 (see FIG. 1). In one embodiment, step 304 includes assigning the customization task to a particular serial number of the client workstation. Step 304 may be completed prior to deployment steps 202 and 204 of the process of FIG. 2.

In step 306, via a remote boot, deployment manager 124 (see FIG. 1) boots the client workstation to which the customization task was assigned in step 304. Furthermore, in step 306 deployment manager 124 (see FIG. 1) writes to shared partition 116 (see FIG. 1) customization parameter information that includes a customization parameter name (a.k.a. customization parameter) that identifies a pre-defined customization script. In one embodiment, the value of the customization parameter is a name of the pre-defined customization script. In another embodiment, the customization parameter includes a reference to the pre-defined customization script. The pre-defined customization script identified by the customization parameter information is described in more detail below relative to step 312.

As one example, if the deployment manager assigns the customization task to the serial number of client workstation 104 (see FIG. 1) in step 304, then the deployment manager writes the customization parameter information to shared partition 116 (see FIG. 1) in step 306. In one embodiment, the deployment manager utilizes the customization task described above relative to step 304 to perform the actions of step 306.

Since client workstation 104 (see FIG. 1) has the network set as the first boot device in the client workstation's BIOS, deployment manager 124 (see FIG. 1) responds to the reboot of client workstation 104 (see FIG. 1) in step 306 by utilizing an environment to bootstrap the client workstation independent of data storage devices (e.g., hard disks) local to the client workstation and independent of operating systems installed on the client workstation. In one embodiment, deployment manager 124 (see FIG. 1) utilizes a PXE to boot the client workstation to a DOS operating system (i.e., the client workstation downloads an image of a DOS operating system via a PXE boot). The use of the PXE boot also allows client workstation 104 (see FIG. 1) to boot up microcode that permits communication with server 102 (see FIG. 1). This client-server communication permitted by the PXE boot allows server 102 (see FIG. 1) to direct the writing of the customization parameter information to shared partition 116 (see FIG. 1) as long as step 304 assigned the customization task to client workstation 104 (see FIG. 1). After the customization parameter information is written to shared partition 116 (see FIG. 1) by deployment manager 124 (see FIG. 1), server 102 (see FIG. 1) terminates the PXE-based communication with client workstation 104 (see FIG. 1).

In one embodiment, a manual intervention at server 102 (see FIG. 1) initiates the step 306 PXE boot. In another embodiment, the PXE boot of step 306 occurs automatically upon a reboot or a powering on of the client workstation after a date and/or time that is scheduled in advance at server 102 (see FIG. 1).

In step 308, client workstation 104 (see FIG. 1) performs its initial reboot subsequent to the boot of step 306. Instead of the remote boot used in step 306, the reboot of step 308 is a local boot (i.e., the boot utilizes a data storage device local to the client workstation and/or an installed operating system local to the client workstation). During the reboot of the client workstation in step 308, an execution of a startup script residing on the client workstation automatically accesses the customization parameter information including the pre-defined customization script name that had been written to shared partition 116 (see FIG. 1) in step 306. In step 310, an execution of a script (e.g., the startup script of step 308) automatically copies the customization parameter information including the pre-defined customization script name accessed in step 308 to a customization parameter file in operating system partition 114 (see FIG. 1).

In one embodiment, the execution of the startup script in steps 308 and 310 mounts the DOS partition and copies the text file (e.g., CUSTOM text file) modified by the LCCUSTOM application to operating system partition 114 (see FIG. 1). The DOS partition is then unmounted and the boot process continues.

In step 312, an execution of a script (e.g., a script separate from the startup script of step 308) residing on client workstation 104 (see FIG. 1) automatically reads the customization parameter file of step 310 and automatically initiates execution of a corresponding customization script embedded in operating system partition 114 (see FIG. 1). The execution of the corresponding customization script automatically customizes client workstation 104 (see FIG. 1). In one embodiment, the execution of the corresponding customization script is initiated only after a local boot of the client workstation in step 312 determines the existence of a text file (e.g., the CUSTOM text file) that includes the customization parameter information (e.g., the name of the corresponding customization script) copied in step 310.

The corresponding customization script of step 312 is included in a set of one or more customization scripts that are pre-defined in the operating system of the donor workstation prior to step 202 of FIG. 2. Each customization script provides a unique set of configuration parameters to configure any of the multiple client workstations in system 100 (see FIG. 1), thereby allowing a single donor workstation operating system image to be deployed to multiple client workstations while also allowing any number of the client workstations to be configured differently. This set of one or more pre-defined customization scripts are deployed to client workstation 104 (see FIG. 1) in step 204 of FIG. 2. The name of the pre-defined customization script that is written to the shared partition in step 306 identifies which of the pre-defined customization scripts is the corresponding customization script initiated in step 312.

In one embodiment, step 312 is performed in response to a local boot of the client workstation that is subsequent to the step 308 reboot. In another embodiment, step 312 is performed in response to the reboot included in step 308.

In step 314, the customization parameter file to which the customization parameter information was copied in step 310 is deleted. The process of customizing a client workstation image ends at step 316.

In another embodiment, steps 310 and 314 are not included in the customization process of FIG. 3, the operating system partition 114 (see FIG. 1) reads the customization parameter information in shared partition 116 (see FIG. 1) without requiring the copying of the customization parameter information into a customization parameter file, and the reading of the customization parameter information is flagged so that subsequent reboots of client workstation 104 (see FIG. 1) avoid initiating further customization using the customization parameter information.

EXAMPLES

FIGS. 4, 5A-5C, 6, 7A-7B and 8 include examples of specific scripts, files, screen displays, and detailed method steps that may be used to implement the deployment and customization processes described above. It should be noted that FIGS. 4, 5A-5C, 6, 7A-7B and 8 are examples only, and the present invention contemplates other implementations of the deployment and customization process of FIGS. 2 and 3.

Figure 4:
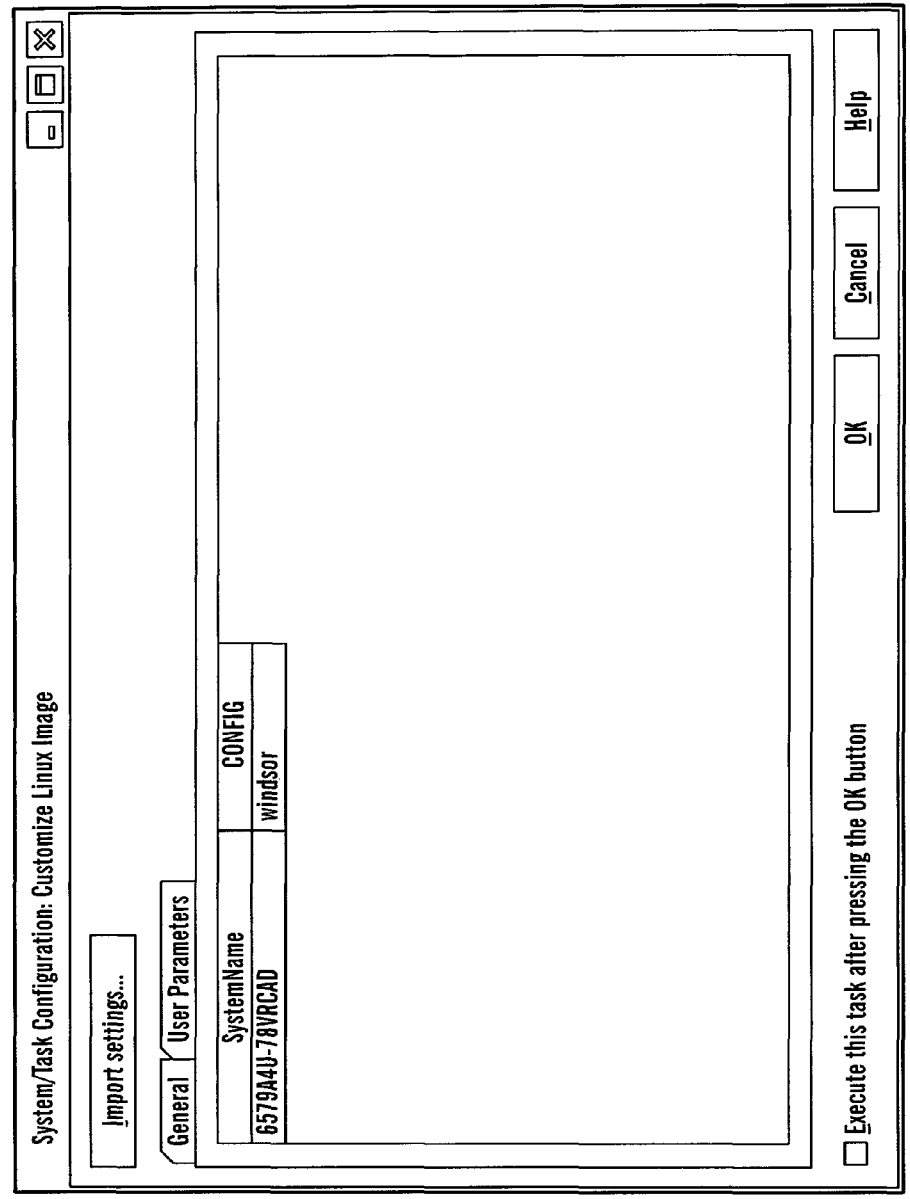
FIG. 4 is an example of applying a customization task to a client workstation in the process of FIG. 3, in accordance with embodiments of the present invention.

FIG. 4 is an example of a screen display 400 in which a customization task is applied to a client workstation in step 304 of FIG. 3. Screen display 400 illustrates the assignment of a customization parameter to a client workstation having serial number 6579A4U-78VRCAD. The customization parameter assignment is associated with a customization task that sets up the client workstation as a "windsor" workstation.

Figure 5A:
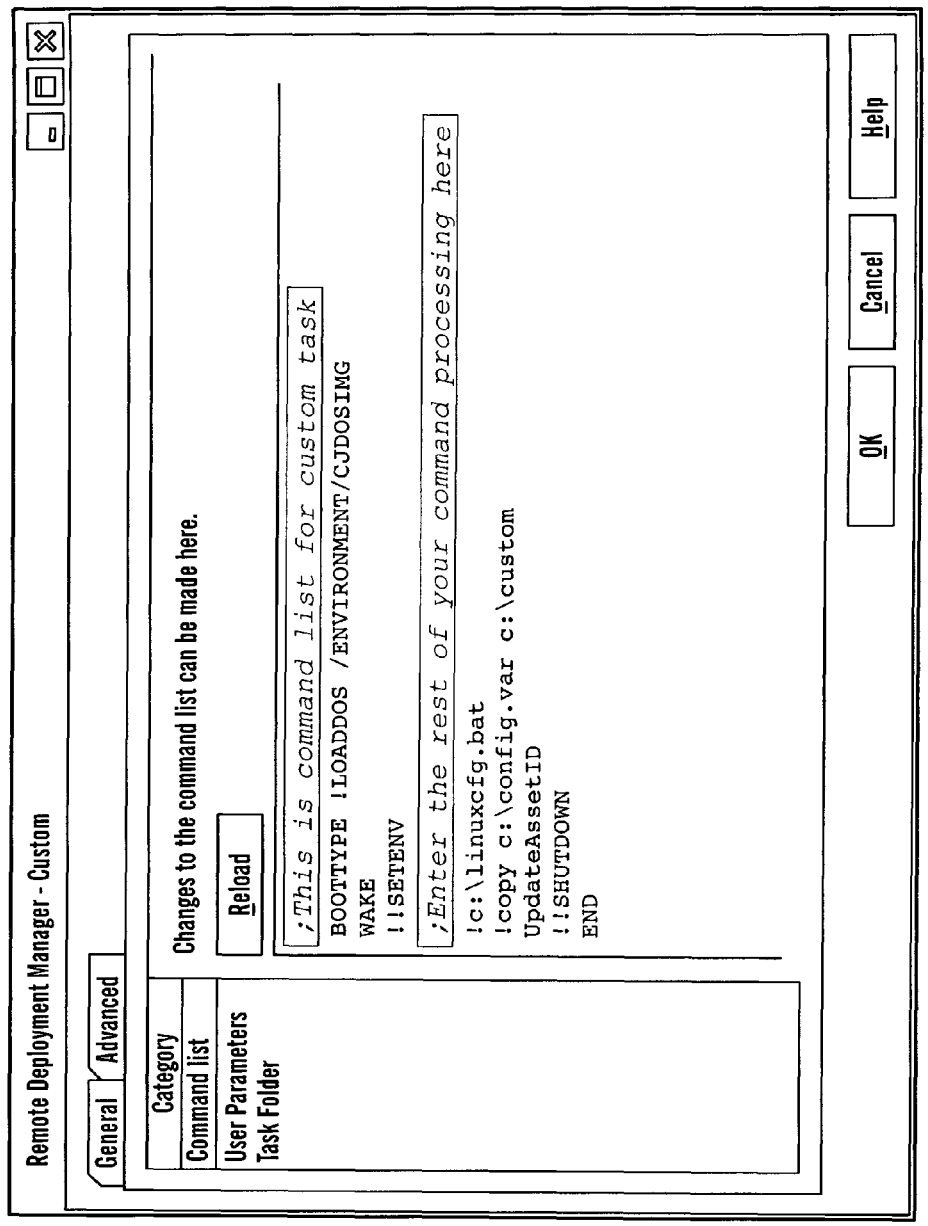
FIG. 5A is an example of a script that writes customization parameter information to a shared partition in the process of FIG. 3, in accordance with embodiments of the present invention.

FIGS. 5A-5C depict examples of code used in performing step 306 of FIG. 3. FIG. 5A is an example of a script 500 that is executed by deployment manager 124 (see FIG. 1) in shared partition 116 (see FIG. 1) during the reboot portion of step 306 (see FIG. 3). The config.var file included in script 500 includes a % CONFIG % variable.

FIG. 5B is an example 550 including a batch file (i.e., linuxcfg.bat) called by script 500 of FIG. 5A in step 306 (see FIG. 3). For instance, the batch file exists within shared partition 116 (see FIG. 1). In the example of FIG. 5B, the batch file is the customization task utilized during step 306 (see FIG. 3) and replaces the % CONFIG % variable in the config.var file. In the example of FIG. 5B, the LCCUSTOM program provided by Remote Deployment Manager software takes the value of the customization parameter entered in the customization task and replaces the % CONFIG % variable in config.var with the customization parameter value.

In one embodiment, the batch file of FIG. 5B is initially generated via the creation of the donor workstation image. In another embodiment, the batch file of FIG. 5B is copied to the shared partition by the deployment manager software in an action that is separate from step 204 of FIG. 2.

FIG. 5C is an example of contents 580 of shared partition 116 (see FIG. 1) that is written to by script 500 of FIG. 5A in step 306 of FIG. 3. Contents 580 include files located in shared partition 116 (see FIG. 1). The config.var file included in contents 580 includes the variable (i.e., % CONFIG %) that is replaced during step 306 of FIG. 3.

FIG. 6 is an example of a script 600 whose execution accesses a customization parameter in a shared partition and copies the customization parameter to a file in an operating system partition in steps 308 and 310, respectively (see FIG. 3). The first line of script 600 corresponds to step 308 (see FIG. 3) and illustrates how shared partition 116 (see FIG. 1) is mounted as a Microsoft® Disk Operating System (MS-DOS®) partition. The –t argument is used to specify the file system type. The if statement of script 600 checks for the existence of a "custom" file that includes the customization parameter information. If the custom file exists, the cat command in script 600 copies the contents of the custom file from shared partition 116 (see FIG. 1) to a customization parameter file on operating system partition 114 (see FIG. 1). In the example of FIG. 6, the customization parameter file on partition 114 (see FIG. 1) is also named "custom."

FIG. 7A is an example of a script 700 that reads a customization parameter file in an operating system partition and initiates an embedded customization script in step 312 of FIG. 3. Script 700 is executed as part of the normal boot process of client workstation 104 (see FIG. 1). Script 700 determines whether the customization parameter file (i.e., the "custom" file) exists on operating system partition 114 (see FIG. 1). If the custom file does exist on operating system partition 114 (see FIG. 1), then the content of the custom file is used to execute the corresponding embedded pre-defined customization script.

FIG. 7B is an example 750 illustrating a list of customization scripts embedded in the donor image. This list of embedded customization scripts is included after the ls command. Example 750 also includes one particular embedded customization script (i.e., "c4") initiated by script 700 of FIG. 7A. In the example of FIG. 7B, the embedded customization script c4 modifies the bookmarks viewable in a user's browser window.

Figure 8:
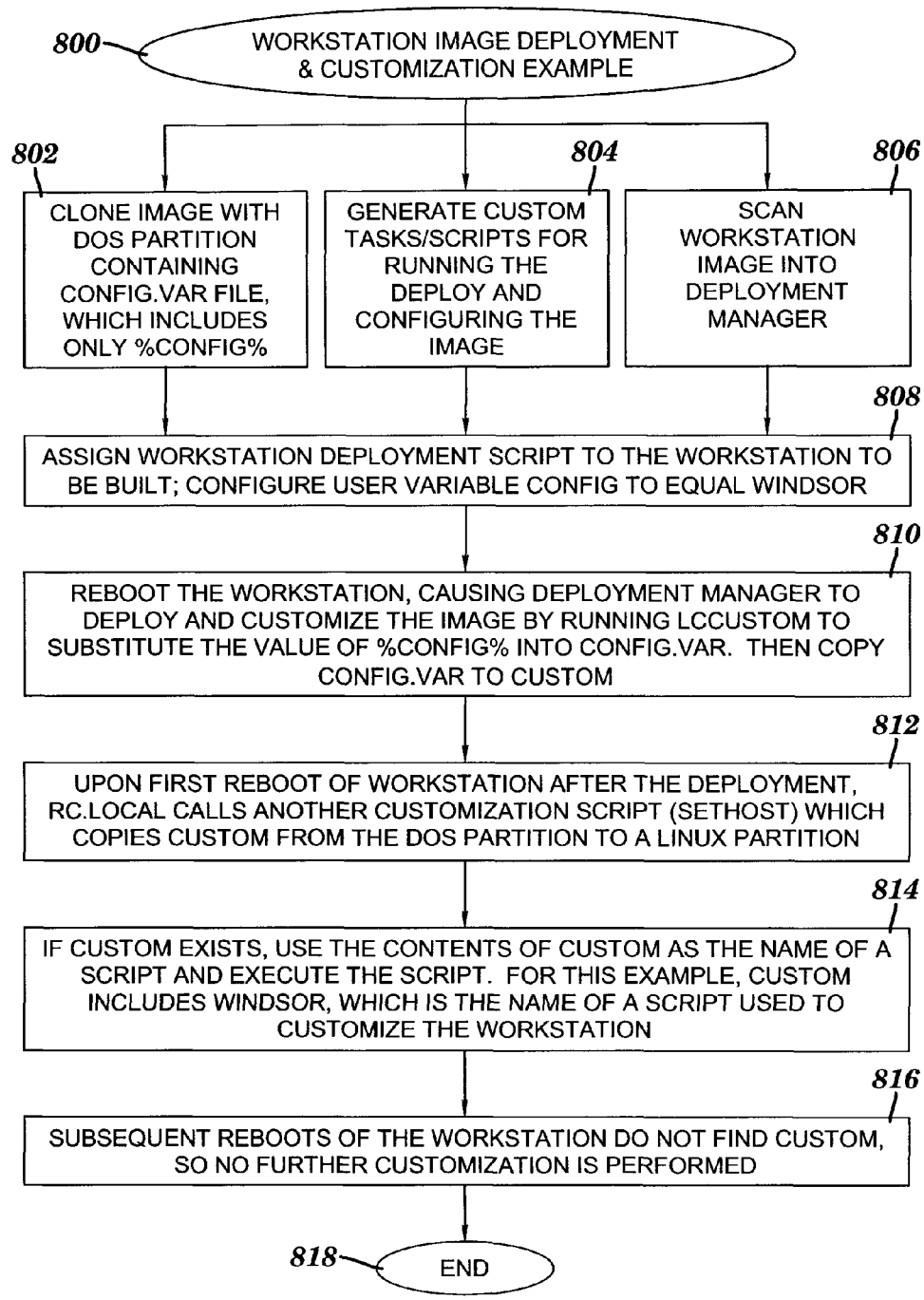
FIG. 8 is a flow chart of an exemplary process of remotely deploying and customizing a Linux operating system image, in accordance with embodiments of the present invention.

FIG. 8 is a flow chart of an exemplary process of remotely deploying and customizing a Linux operating system image, in accordance with embodiments of the present invention. The Linux image deployment and customization process begins at step 800. In step 802, a Linux operating system image is cloned with a DOS partition (e.g., shared partition 116 of FIG. 1) containing a config.var file, which includes only a % CONFIG % user variable. In step 804, one or more custom tasks and one or more customization scripts are generated. These generated custom tasks and customization scripts are for running the deployment process and for configuring the Linux operating system image. In step 806, the donor workstation image is scanned into deployment manager 124 (see FIG. 1). Steps 802, 804 and 806 can be performed in parallel, and their completion is followed by step 808.

In step 808, a deployment script for the donor workstation is assigned to a client workstation to be built. In the example of FIG. 8, the user variable CONFIG is configured to equal WINDSOR. In the example of FIG. 8, WINDSOR is the name of a pre-defined customization script embedded in the donor workstation image. Step 808 corresponds to step 304 of FIG. 3.

In step 810, the client workstation is rebooted by server 102 (see FIG. 1), causing deployment manager 124 (see FIG. 1) to deploy and customize the Linux operating system image by running LCCUSTOM to substitute the value of % CONFIG % into the config.var file. The config.var file is then copied into a file named CUSTOM in the DOS partition. Step 810 corresponds to step 306 of FIG. 3.

In step 812, upon the first reboot of the client workstation after the deployment in step 810, RC.LOCAL calls another customization script (i.e., SETHOST), which copies CUSTOM from the DOS partition to a Linux operating system partition (e.g., partition 114 of FIG. 1). RC.LOCAL is one of the files called when the Linux operating system starts. Step 812 corresponds to steps 308 and 310 of FIG. 3.

Upon a boot of the client workstation subsequent to step 812, a script executed by the client workstation determines in step 814 whether CUSTOM exists in the Linux operating system partition. If step 814 determines that CUSTOM exists, the contents of CUSTOM are used as the name of a script to be executed. In the example of FIG. 8, CUSTOM exists and includes WINDSOR. Therefore, the client workstation executes the pre-defined customization script named WINDSOR to customize the client workstation. Step 814 corresponds to step 312 of FIG. 3.

After the execution of the WINDSOR script in step 814, CUSTOM is deleted from the Linux operating system partition in an action that corresponds to step 314 of FIG. 3. In step 816, upon reboots of the client workstation subsequent to step 814, the client workstation's checks for the existence of CUSTOM do not locate CUSTOM, and therefore no further customization is performed. The example process of FIG. 8 ends at step 818.

Computing System

Figure 9:
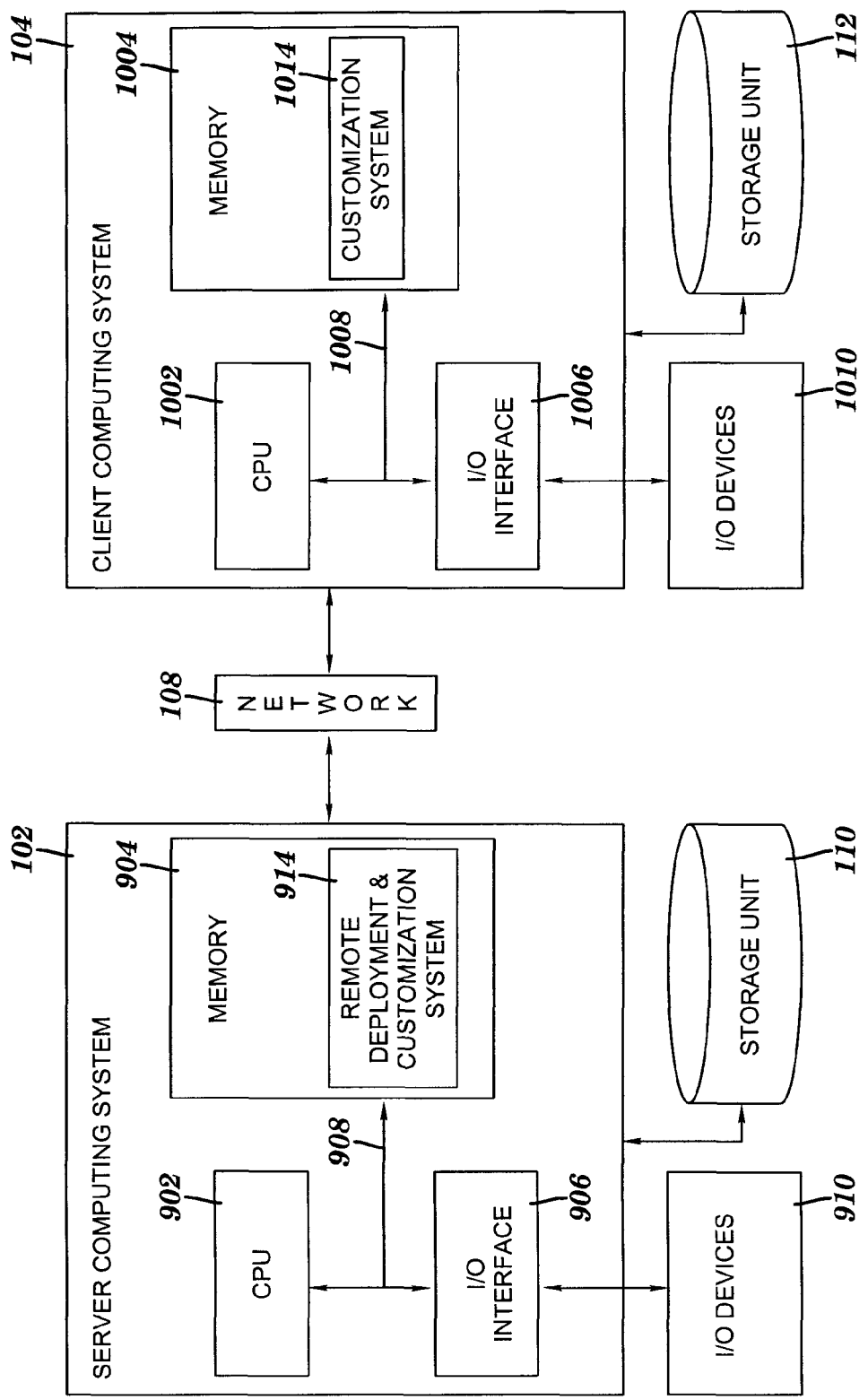
FIG. 9 is a block diagram of a computing system that is included in the system of FIG. 1 and that implements the processes of FIGS. 2 and 3, in accordance with embodiments of the present invention.

FIG. 9 is a block diagram of a server computing system 102 and a client computing system 104 that are included in the system of FIG. 1 and that implement the processes of FIGS. 2 and 3, in accordance with embodiments of the present invention. Computing systems 102 and 104 are in communication with each other via network 108. Server computing system 102 is suitable for storing and/or executing program code of a remote deployment and customization system 914, and generally comprises a central processing unit (CPU) 902, a memory 904, an input/output (I/O) interface 906, a bus 908, I/O devices 910 and a storage unit 110. CPU 902 performs computation and control functions of server computing system 102. CPU 902 may comprise a single processing unit, or be distributed across one or more processing units in one or more locations (e.g., on a client and server). In one embodiment, steps 202-206 of FIG. 2 and steps 302-306 of FIG. 3 are performed by the execution of logic residing in remote deployment and customization system 914.

Local memory elements of memory 904 are employed during actual execution of the program code for remote deployment and customization system 914. Cache memory elements of memory 904 provide temporary storage of at least some program code in order to reduce the number of times code must be retrieved from bulk storage during execution. Further, memory 904 may include other systems not shown in FIG. 9, such as an operating system (e.g., Linux) that runs on CPU 902 and provides control of various components within and/or connected to server computing system 102.

Memory 904 may comprise any known type of data storage and/or transmission media, including bulk storage, magnetic media, optical media, random access memory (RAM), read-only memory (ROM), a data cache, a data object, etc. Storage unit 110 is, for example, a magnetic disk drive or an optical disk drive that stores data. Moreover, similar to CPU 902, memory 904 may reside at a single physical location, comprising one or more types of data storage, or be distributed across a plurality of physical systems in various forms. Further, memory 904 can include data distributed across, for example, a LAN, WAN or storage area network (SAN) (not shown).

I/O interface 906 comprises any system for exchanging information to or from an external source. I/O devices 910 comprise any known type of external device, including a display monitor, keyboard, mouse, printer, speakers, handheld device, printer, facsimile, etc. Bus 908 provides a communication link between each of the components in computing unit 102, and may comprise any type of transmission link, including electrical, optical, wireless, etc.

I/O interface 906 also allows server computing system 102 to store and retrieve information (e.g., program instructions or data) from an auxiliary storage device (e.g., storage unit 110). The auxiliary storage device may be a non-volatile storage device (e.g., a CD-ROM drive which receives a CD-ROM disk). Server computing system 102 can store and retrieve information from other auxiliary storage devices (not shown), which can include a direct access storage device (DASD) (e.g., hard disk or floppy diskette), a magneto-optical disk drive, a tape drive, or a wireless communication device.

Client computing system (i.e., client workstation) 104 is suitable for storing and/or executing program code of a system 1014 for customizing client workstation 104, and generally comprises a CPU 1002, a memory 1004, an I/O interface 1006, a bus 1008, I/O devices 1010 and a storage unit 112, which have functions and features analogous, respectively, to CPU 902, memory 904, I/O interface 906, bus 908, I/O devices 910 and storage unit 110, as described above. In one embodiment, step 208 of FIG. 2 and steps 308-314 of FIG. 3 are performed by the execution of logic residing in customization system 1014.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for remote deployment and customization of workstation images for use by or in connection with a computing unit 102 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 904, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically customizing remotely deployed workstation images, said method comprising:

receiving, at a first partition of a data storage unit coupled to a client workstation of a plurality of client workstations, a deployment of a single workstation image from a server computing system as a result of multiple deployments of said single workstation image from said server computing system to said plurality of client workstations, said single workstation image originally cloned from a donor workstation and including a plurality of pre-defined customization scripts for customizing said plurality of client workstations, wherein said plurality of pre-defined customization scripts includes a pre-defined customization script for customizing said client workstation;

subsequent to said receiving said deployment of said single workstation image and based on said server computing system being configured as a device that boots first for said client workstation via a network, booting said client workstation via a remote boot by said server computing system on said network, wherein said booting said client workstation via said remote boot includes a shared partition of said data storage unit coupled to said client workstation receiving an identifier of said pre-defined customization script from said server computing system, wherein access to said shared partition is shared by said server computing system and by said first partition of said data storage unit coupled to said client workstation; and rebooting said client workstation subsequent to said booting said client workstation via said remote boot, wherein said rebooting includes:

said first partition of said data storage unit coupled to said client workstation retrieving said identifier of said pre-defined customization script from said shared partition;

based on said retrieved identifier of said pre-defined customization script, said client workstation selecting said pre-defined customization script from among said plurality of pre-defined customization scripts included in said single workstation image; and subsequent to said receiving said deployment of said single workstation image, a processor of said client workstation executing said selected pre-defined customization script, wherein said executing said selected pre-defined customization script results in an automatic and remote customization of said client workstation after said receiving said deployment of said single workstation image, based on said identifier of said pre-defined customization script retrieved from said shared partition, and without said client workstation running communication software.

2. The method of claim 1, wherein said rebooting comprises:

locally booting said client workstation a first time subsequent to said booting via said remote boot, wherein said locally booting said first time includes said retrieving said identifier of said pre-defined customization script; and locally booting said client workstation a second time subsequent to said locally booting said first time, wherein said locally booting said second time includes said selecting said pre-defined customization script and said executing said selected pre-defined customization script.

3. The method of claim 2, wherein said locally booting said first time further includes:

said client workstation retrieving said identifier of said pre-defined customization script from said shared partition; and said client workstation copying said identifier of said pre-defined customization script to a customization parameter file in said first partition.

4. The method of claim 2, wherein said locally booting said second time further includes:

reading a customization parameter file in said first partition, wherein said customization parameter file includes said identifier of said pre-defined customization script, and wherein said identifier of said pre-defined customization script is a name of said pre-defined customization script,
wherein said selecting said pre-defined customization script from among said plurality of pre-defined customization scripts includes selecting said pre-defined customization script based on said name of said pre-defined customization script,
wherein said executing said selected pre-defined customization script is performed in response to said selecting said pre-defined customization script based on said name of said pre-defined customization script.

5. The method of claim 2, wherein said locally booting said first time further includes copying said identifier of said pre-defined customization script to a customization parameter file in said first partition and wherein said method further comprises deleting said customization parameter file in response to said locally booting said second time.

6. The method of claim 1, wherein said single workstation image is an image of an operating system that supports a File Allocation Table (FAT) file system type, and wherein said server computing system supports said FAT file system type.

7. The method of claim 1, wherein said booting further includes booting said client workstation to a Disk Operating System (DOS) operating system via a Pre-boot Execution Environment (PXE) boot that permits communication between said client workstation and said server computing system so that said server computing system writes said name of said pre-defined customization script to said shared partition.

8. A computer program product comprising a non-transitory computer readable storage medium having a computer-usable program code stored therein, said computer-usable program code containing instructions configured to be executed by a processor of a client workstation to implement a method of automatically customizing remotely deployed workstation images, said method comprising:
receiving, at a first partition of a data storage unit coupled to said client workstation of a plurality of client workstations, a deployment of a single workstation image from a server computing system as a result of multiple deployments of said single workstation image from said server computing unit to said plurality of client workstations, said single workstation image originally cloned from a donor workstation and including a plurality of pre-defined customization scripts for customizing said plurality of client workstations, wherein said plurality of pre-defined customization scripts includes a pre-defined customization script for customizing said client workstation;
subsequent to said receiving said deployment of said single workstation image and based on said server computing system being configured as a device that boots first for said client workstation via a network, booting said client workstation via a remote boot by said server computing system on said network, wherein said booting said client workstation via said remote boot includes a shared partition of said data storage unit coupled to said client workstation receiving an identifier of said pre-defined customization script from said server computing system, wherein access to said shared partition is shared by said server computing system and by said first partition of said data storage unit coupled to said client workstation; and
rebooting said client workstation subsequent to said booting said client workstation via said remote boot, wherein said rebooting includes:
said first partition of said data storage unit coupled to said client workstation retrieving said identifier of said pre-defined customization script from said shared partition;
based on said retrieved identifier of said pre-defined customization script, said client workstation selecting said pre-defined customization script from among said plurality of pre-defined customization scripts included in said single workstation image; and
subsequent to said receiving said deployment of said single workstation image, said processor of said client workstation executing said selected pre-defined customization script, wherein said executing said selected pre-defined customization script results in an automatic and remote customization of said client workstation after said receiving said deployment of said single workstation image, based on said identifier of said pre-defined customization script retrieved from said shared partition, and without said client workstation running communication software.

9. The program product of claim 8, wherein said rebooting comprises:
locally booting said client workstation a first time subsequent to said booting via said remote boot, wherein said locally booting said first time includes said retrieving said identifier of said pre-defined customization script; and
locally booting said client workstation a second time subsequent to said locally booting said first time, wherein said locally booting said second time includes said selecting said pre-defined customization script and said executing said selected pre-defined customization script.

10. The program product of claim 9, wherein said locally booting said first time further includes:
retrieving said identifier of said pre-defined customization script from in said shared partition; and
copying said identifier of said pre-defined customization script to a customization parameter file in said first partition.

11. The program product of claim 9, wherein said locally booting said second time further includes:
reading a customization parameter file in said first partition, wherein said customization parameter file includes said identifier of said pre-defined customization script, and wherein said identifier of said pre-defined customization script is a name of said pre-defined customization script,
wherein said selecting said pre-defined customization script from among said plurality of pre-defined customization scripts includes selecting said pre-defined customization script based on said name of said pre-defined customization script, and
wherein said executing said selected pre-defined customization script is performed in response to said selecting said pre-defined customization script based on said name of said pre-defined customization script.

12. The program product of claim 9, wherein said locally booting said first time further includes copying said identifier of said pre-defined customization script to a customization parameter file in said first partition and wherein said program product further comprises deleting said customization parameter file in response to said locally booting said second time.

13. The program product of claim 8, wherein said booting includes booting said client workstation to a Disk Operating System (DOS) operating system via a Pre-boot Execution Environment (PXE) boot that permits communication between said client workstation and said server computing system so that said server computing system writes said name of said pre-defined customization script to said shared partition.

14. A computer-implemented method of remotely deploying and automatically customizing client workstation images, said method comprising:

deploying, by a server computing system, a single workstation image to a plurality of client workstations, wherein said deploying said single workstation image includes deploying said single workstation image to first partition of a data storage unit coupled to a client workstation of said plurality of client workstations, said single workstation image originally cloned from a donor workstation and including a plurality of pre-defined customization scripts for customizing said plurality of client workstations, wherein said plurality of pre-defined customization scripts includes a pre-defined customization script for customizing said client workstation; and remotely booting said client workstation by a processor of said server computing system on said network subsequent to said deploying said single workstation image, wherein said client workstation is pre-configured to be booted by said server computing system via a network, wherein said remotely booting includes writing a customization parameter name to a shared partition of said data storage unit coupled to said client workstation, said shared partition having a file system type that is accessible by said server computing system via said remotely booting and by said deployed single workstation image, wherein said customization parameter name identifies said pre-defined customization script from among said plurality of pre-defined customization scripts, wherein said remotely booting initiates an automatic customization of said client workstation, said automatic customization including one or more reboots of said client workstation, said one or more reboots subsequent to said remotely booting and subsequent to said deploying said single workstation image, and wherein said one or more reboots include: an automatic retrieval of said customization parameter name from said shared partition by said deployed single workstation image, an automatic selection of said pre-defined customization script from among said plurality of pre-defined customization scripts included in said single workstation image by a utilization of said customization parameter name as an identifier of said pre-defined customization script, and an automatic execution of said pre-defined customization script, said automatic execution resulting in said automatic customization of said client workstation after said deploying said single workstation image, based on said automatic retrieval of said customization parameter name from said shared partition, further based on said utilization of said customization parameter name as said identifier of said pre-defined customization script, and without said client workstation running communication software.

15. The method of claim 14, further comprising:
configuring, by said server computing system, a deployment manager customization task that includes customization information for said automatic customization of said client workstation; and
storing, by said server computing system and in response to said configuring, said deployment manager customization task in a configurations repository coupled to said server computing system, wherein said deploying said single workstation image includes deploying said deployment manager customization task to said first partition, said deployment manager customization task being deployed within said single workstation image.

16. The method of claim 15, further comprising:
assigning, by said server computing system, said deployment manager customization task to an identifier of said client workstation;
determining, by said server computing system and in response to said remotely booting, said client workstation is associated with said customization information via said assigning said deployment manager customization task to said identifier of said client workstation; and
initiating, by said server computing system, said remotely booting in response to said determining said client workstation is associated with said customization information.

17. A computer program product comprising a non-transitory computer readable storage medium having a computer-usable program code stored therein, said computer-usable program code containing instructions configured to be executed by a processor of a server computing system to implement a method of remotely deploying and automatically customizing client workstation images, said method comprising:

deploying, by said server computing system, a single workstation image to a a plurality of client workstations, wherein said deploying said single workstation image includes deploying said single workstation image to a first partition of a data storage unit coupled to a client workstation of said plurality of client workstations, said single workstation image originally cloned from a donor workstation and including a plurality of pre-defined customization scripts for customizing said plurality of client workstations, wherein said plurality of pre-defined customization scripts includes a pre-defined customization script for customizing said client workstation; and remotely booting said client workstation by said processor of said server computing system on said network subsequent to said deploying said single workstation image, wherein said client workstation is pre-configured to be booted by said server computing system via a network, wherein said remotely booting includes writing a customization parameter name to a shared partition of said data storage unit coupled to said client workstation, said shared partition having a file system type that is accessible by said server computing system via said remotely booting and by said deployed single workstation image, wherein said customization parameter name identifies said pre-defined customization script from among said plurality of pre-defined customization scripts, wherein said remotely booting initiates an automatic customization of said client workstation, said automatic customization including one or more reboots of said client workstation, said one or more reboots subsequent to said remotely booting and subsequent to said deploying said single workstation image, and wherein said one or more reboots include: an automatic retrieval of said customization parameter name from said shared partition by said deployed single workstation image, an automatic selection of said pre-defined customization script from among said plurality of pre-defined customization scripts included in said single workstation image by a utilization of said customization parameter name as an identifier of said pre-defined customization script, and an automatic execution of said pre-defined customization script, said automatic execution resulting in said automatic customization of said client workstation after said deploying said single workstation image, based on said automatic retrieval of said customization parameter name from said shared partition, further based on said utilization of said customization parameter name as said identifier of said pre-defined customization script, and without said client workstation running communication software.

18. The program product of claim 17, wherein said method further comprises:
configuring, by said server computing system, a deployment manager customization task that includes customization information for said automatic customization of said client workstation; and
storing, by said server computing system and in response to said configuring, said deployment manager customization task in a configurations repository coupled to said server computing system,
wherein said deploying said single workstation image includes deploying said deployment manager customization task to said first partition, said deployment manager customization task being deployed within said single workstation image.

19. The program product of claim 18, wherein said method further comprises:
assigning, by said server computing system, said deployment manager customization task to an identifier of said client workstation;
determining, by said server computing system and in response to said remotely booting, said client workstation is associated with said customization information via said assigning said deployment manager customization task to said identifier of said client workstation; and
initiating, by said server computing system, said remotely booting in response to said determining said client workstation is associated with said customization information.

20. The method of claim 1, wherein said receiving said deployment of said single workstation image includes receiving said deployment of said single workstation image deployed by a software-based deployment manager executing on said server computing system, and wherein said shared partition is a file system space of storage local to said client workstation and accessible by said deployment manager and said first partition of said data storage unit coupled to said client workstation.

* * * * *